(12) United States Patent
Garcia (10) Patent No.: US 12,187,200 B2
(45) Date of Patent: Jan. 7, 2025

(54) MOTOR VEHICLE CAMERA ASSEMBLY

(71) Applicant: FICOSA ADAS, S.L.U., Barcelona (ES)

(72) Inventor: Daniel Abad Garcia, Barcelona (ES)

(73) Assignee: FICOSA ADAS, S.L.U., Barcelona (ES)

( * ) Notice: Subject to any disclaimer, the term of this patent is extended or adjusted under 35 U.S.C. 154(b) by 33 days.

(21) Appl. No.: 17/082,677

(22) Filed: Oct. 28, 2020

(65) Prior Publication Data
US 2021/0122299 A1 Apr. 29, 2021

(30) Foreign Application Priority Data
Oct. 28, 2019 (EP) .................................... 19382936

(51) Int. Cl.
*B60R 11/04* (2006.01)
*B60R 11/00* (2006.01)

(52) U.S. Cl.
CPC ....... *B60R 11/04* (2013.01); *B60R 2011/0066* (2013.01)

(58) Field of Classification Search
CPC ............ B60R 11/04; B60R 2011/0066; H04N 5/2252; G03B 17/12
See application file for complete search history.

(56) References Cited

U.S. PATENT DOCUMENTS

| | | | |
|---|---|---|---|
| 7,679,156 B2 | 3/2010 | Bogdan et al. | |
| 8,482,664 B2 | 7/2013 | Byrne et al. | |
| 8,542,451 B2 | 9/2013 | Lu et al. | |
| 2004/0017501 A1* | 1/2004 | Asaga | H04N 23/55 348/340 |
| 2006/0202293 A1 | 9/2006 | Bogdan et al. | |
| 2008/0143870 A1* | 6/2008 | Tanaka | H04N 1/00525 348/E5.025 |
| 2010/0097519 A1 | 4/2010 | Byrne et al. | |
| 2014/0111682 A1* | 4/2014 | Flugge | G03B 17/02 29/446 |
| 2016/0191863 A1* | 6/2016 | Minikey, Jr. | G02B 7/02 348/148 |
| 2017/0057423 A1* | 3/2017 | Wang | H04N 5/2251 |
| 2017/0272624 A1 | 9/2017 | Minikey, Jr. et al. | |
| 2017/0302829 A1 | 10/2017 | Mleczko et al. | |
| 2017/0320449 A1* | 11/2017 | Park | H04N 23/54 |
| 2018/0098033 A1* | 4/2018 | Mleczko | H04N 7/183 |
| 2021/0092271 A1* | 3/2021 | Nakamura | H04N 5/2253 |
| 2021/0197733 A1* | 7/2021 | Percival | H04N 23/52 |

OTHER PUBLICATIONS

European Search Report for Application No. 19382936.3 dated May 13, 2020, 7 pgs.

* cited by examiner

*Primary Examiner* — Kathleen V Nguyen
(74) *Attorney, Agent, or Firm* — Brooks Kushman P.C.

(57) ABSTRACT

The motor vehicle camera assembly includes a first housing part, a second housing part, and an attaching mechanism for attaching the first and second housing parts together defining an inner space for receiving at least an electronics carrier. The attaching mechanism is configured such that, when the first and second housing parts are attached to each other, the first housing part contacts at least one portion of a first surface of the electronics carrier and the second housing part contacts at least one portion of a second surface of the electronics carrier. The first housing part may be coupled to the second housing part with the electronics carrier being tightly sandwiched there between.

17 Claims, 9 Drawing Sheets

MOTOR VEHICLE CAMERA ASSEMBLY

CROSS-REFERENCE TO RELATED APPLICATIONS

This application claims priority to EP application Serial No. 19382936.3 filed Oct. 28, 2019, the disclosure of which is hereby incorporated in its entirety by reference herein.

TECHNICAL FIELD

The present disclosure relates to vehicle camera assemblies.

BACKGROUND

Housing assemblies comprising housing parts that define an inner space for receiving therein at least an electronics carrier for different purposes are widely known in the art, for example in the automotive sector.

For example, cameras in motor vehicles, e.g. parking cameras, typically include a housing assembly suitable for housing electronics components therein such as electronics carrier, camera lens, image sensor, and so on. The housing assembly generally comprises a first housing part also referred to as front housing and a second housing part also referred to as back housing. Until only some years ago, both housing parts in prior art camera housing assemblies have been generally made of plastics. The first housing part and the second housing part are attached together by ultrasonic welding.

At present, motor vehicle cameras are more powerful. In addition to the above mentioned electronics components, known motor vehicle cameras also include a control unit configured to operate, for example, as an image processing system. As a result, great amounts of heat are generated inside the housing assembly. In order to dissipate heat as quickly as possible to the outside of the housing assembly, plastic housing parts have been more recently replaced with metal housing parts.

The electronics carrier may be, for example, in the form of a printed circuit board (PCB). The electronics carrier is fitted inside the housing assembly, arranged between the first housing part and the second housing part. In use, the housing parts are attached to each other by via, for example, screws passing through the material of the electronics carrier. Other known mechansims for attaching the housing parts to each other are ultrasonic welding when housing parts are made of plastic, and laser welding when housing parts are made of metal. Attachment of the housing parts may be alternatively carried out by gluing.

U.S. Pat. No. 8,482,664 discloses a vehicle camera comprising a front housing having an interior surface with a coating of electrically conductive material, a lens member mounted to the front housing, an imaging element positioned to receive images from the lens member, a circuit board configured to send signals relating to images received by the imaging element and a rear housing member having an electrically conductive material thereon. The front and rear housings are sized to mate together with an interference fit such that the coatings are engaged with each other.

U.S. Pat. No. 7,679,156 provides an optical module comprising a circuit carrier, a semiconductor element disposed in a housing on said circuit carrier with a support formed thereon, and a lens unit configured for projecting electromagnetic radiation onto the semiconductor element, with the semiconductor element and the lens unit being are formed in two parts. The lens unit comprises a lens holder and a lens assembly. The lens holder is connected to the circuit carrier via a screw connection or an adhesive joint.

U.S. Pat. No. 8,542,451 shows a vehicle camera including an imager, a lens holder and a lens. The imager is mounted to a printed circuit board and it is positioned to receive optical images from the lens. The imager is connected to the lens holder by a plurality of threaded fasteners through the printed circuit board.

One significant disadvantage associated with the above housing assemblies is that sealing is not always well applied. In addition, tightness problems between the housing parts often arise. Furthermore, alignment between electronics components inside the housing assembly, such as lens assembly and image sensor, can not usually be suitably accomplished with the above housing assemblies.

There thus remains a need for vehicle camera assemblies for motor vehicles in which sealing is improved, alignment of parts is properly ensured, and heat dissipation is enhanced, without increasing costs.

SUMMARY

A motor vehicle camera assembly is disclosed herein. The present motor vehicle camera assembly comprises a first housing part, a second housing part, and at least one electronics carrier. At least one of the first housing part and the second housing part may be made for example of an electrically conductive material. It is preferred that both the first and second housing parts are made of an electrically conductive material. A suitable electrically conductive material may be, for example, aluminum.

Throughout the present description, reference will be made interchangeably to a "first housing part" or to a "front housing". Reference will be also made interchangeably to a "second housing part" or to a "back housing". Also, throughout the present description, "in use" refers to a condition in which the motor vehicle camera assembly is ready for operation, with the first housing part and the second housing part attached to one another. In addition, throughout the present description, "optical axis" refers to a geometrical longitudinal axis associated with an optical system such as a camera lens that defines a path along which light is propagated.

The first housing part and the second housing part in the present motor vehicle camera assembly are configured to be attached to each other so as to define an inner space for receiving therein the above-mentioned electronics carrier(s). The first housing part and the second housing part are configured to be attached to each other such that, in use, the first housing part and the second housing part are arranged facing each other such that a contact interface is defined there between. Such attaching arrangement enhances heat dissipation as opposed to prior art housing assemblies where most of the time the housing parts are at least partially inserted into one another.

The electronics carrier which, in use, is fitted within the housing assembly, may be, for example, a printed circuit board (PCB), that in turn may include electronics components therein, or the electronics carrier may be any substrate that supports electronics components such as an image sensor, as it will be described below. In one example, the electronics carrier is a single, rigid PCB, not comprising other PCBs. It may be preferred that the electronics carrier is provided with a conductive material in contact areas for contacting the first housing part and the second housing part.

Attachment of the first housing part and the second housing part is accomplished by a attaching mechanism. The attaching mechanism is configured such that, when the first and second housing parts are attached to each other, the first housing part contacts at least one portion of a first surface of the electronics carrier and the second housing part contacts at least one portion of a second surface of the electronics carrier. It is also preferred that, in use, the first housing part and the second housing part are attached into contact with each other.

Advantageously, the first housing part is adapted to be coupled to the second housing part with the electronics carrier being tightly sandwiched there between. For this purpose, the first housing part has a first contact area and the second housing part has a second contact area. The first and second contact areas are defined in an interface between the first and second housing parts. The first and second contact areas are preferably rigid, flat, non-deformable surfaces. In use, contact pressure is applied to corresponding first and second surfaces of the electronics carrier by the first and second contact areas of the first and second housing parts. For this purpose, it is preferred that the first and second housing parts are configured to be attached to each other with an interference fit with the first and second housing parts being electrically connected to the electronics carrier. In one example, the attaching mechanism is adapted to tightly clamp the electronics carrier in a direction parallel to an optical axis, or perpendicular to the first and second surfaces of the electronics carrier.

At least one of the first housing part and the second housing part may be provided with protrusions extending along the direction of the optical axis or parallel thereto, or perpendicular to the first and second surfaces of the electronics carrier. The above-mentioned contact portions of the housing parts would be in this case formed in the protrusions. The contact portions may preferably be thermal and/or electrical conductors.

A lens assembly may be provided. In one example, the lens assembly is attached, e.g. screwed or glued, to the first housing part. As stated above, the electronics carrier such as a PCB may include electronics components such as an image sensor. In this case, the lens assembly is arranged in communication to the above-mentioned image sensor. The image sensor, also referred herein to as photo-sensor or imager, which may be, for example, an RGB sensor for image capturing, is coupled to the first surface or the second surface of the electronics carrier so as to capture an optical image from the exterior.

In one example, the attaching mechanism comprise at least one attaching member adapted to be at least partially inserted through the first and second housing parts, for example through holes formed therein. The attaching member may be for example one or more screws, bolts, threaded pins, fasteners, combinations thereof, or any other member suitable for attaching the first and second housing parts to each other.

In the present motor vehicle camera assembly with the attaching mechanism as described above, efficient attachment of the first housing part and the second housing part is reliably ensured. Proper alignment of the first and second housing parts, and therefore that of the lens assembly and the image sensor, is also ensured by the attaching mechanism. As a result, a good camera performance is advantageously ensured. Furthermore, the attaching members also allow the first and second housing parts to be suitably sealed to each other, preferably in a watertight manner, allowing electronic parts to be suitably and safely received therein.

One or more open notches may be formed in the electronics carrier. The open notches are suitably sized and shaped for positioning the electronics carrier, suitably centered within the housing parts. The open notches may be also suitable for receiving attaching members such that they do not pass through the electronics carrier. Thus, in use, the attaching members are arranged passing through open areas of the electronics carrier. This increases useful space in the electronics carrier which is advantageous since the electronics carrier has an increasing number of electronic components therein. Thus, in use, there are no parts piercing or crossing the material of the electronics carrier. Said open notch or notches may be located for example at one or more corners of the electronics carrier. Throughout the present description, an "open notch" refers to a hole, indentation, cut, or incision in an area of the electronics carrier wherein the perimeter of such hole, indentation, cut, or incision is not closed, that is, not completely surrounded by the material of the electronics carrier.

It may be preferred that the attaching member is adapted to be at least partially inserted into the first housing part and at least substantially fully inserted into the second housing part for attaching both housing parts to each other. It may be also preferred that one or more threaded holes are formed in one of the first or second housing parts and one or more blind holes are formed in the other of the first or second housing parts.

A seal may be included in an outermost peripheral position of the first and second housing parts for sealing there between. Specifically, it is preferred that the seal is provided between the attaching members and the electronics carrier. Alternatively, the seal may be provided in a contact surface between the first and second housing parts. This is advantageous since if water enters the holes in the housing parts, water is prevented from reaching the electronics carrier.

The seal may comprise an electrically conductive material arranged between the respective contact areas in the first and second housing parts where the above-mentioned contact interface is defined. The seal may comprise a heat conductive material. It may be also preferred that the seal is of an elastic and deformable nature.

In use, the first housing part and the second housing part in the present motor vehicle camera assembly are in direct contact with the electronics carrier that is arranged, preferably pressure-sandwiched, there between, with its opposite surfaces in contact with the respective contact areas in the first and second housing parts. As discussed above, attachment of the first housing part, the electronics carrier, and the second housing part is carried out with no elements passing through the material of the electronics carrier.

As a result, a housing assembly with good water-proof properties is obtained in which water from the outside is prevented from entering through the attaching members. This greatly simplifies assembly operations since the rubber gaskets between the attaching members, typically the screw heads, and the housing parts are no longer necessary.

In addition, heat generated by the PCB is efficiently dissipated due to contact of the first housing part and one side of the PCB and contact of the second housing part and the other side of the PCB. Heat dissipation is carried out more easily and faster than prior art solutions where the PCB is attached to the first housing part via screws. A back side of the second housing part is provided with a number of heat dissipators whose geometry is suitable for further dissipating heat.

Dissipation of heat generated by the camera electronics in the present housing assembly is highly improved by having the first housing part, the electronics carrier, and the second housing part arranged with direct contact with each other in use. Due to such improved heat dissipation, the housing assembly is capable of suitably withstanding great amounts of heat that may be generated by camera electronics components received therein during use. Also, with the above described configuration, there is no need for including expensive thermal conductive particles in the housing parts, such as silver as in prior art housing assemblies in combination with a seal such as rubber gaskets made of an insulating material. Furthermore, with the above configuration, electromagnetism properties are also enhanced due to contact of the first housing part and the second housing part with the electronics carrier.

A lightweight housing assembly is obtained in which complexity and costs are advantageously reduced. The parts of the present housing assembly can be assembled efficiently and quickly without adversely affecting good performance. The above described attaching mechanism remove the need for glue or other similar mechanism for attaching the housing parts and the electronics carrier.

Two advantageous examples of the present housing assembly will be described below.

In a first example, the attaching member is arranged with a longitudinal axis thereof arranged perpendicular to at least one of the first and second surfaces of the electronics carrier or parallel to the optical axis of the lens assembly. If the attaching members include fasteners such as screws, as stated above, the force between the front housing and the back housing is increased as the screws are tightened resulting in the electronics carrier being sandwiched under pressure. This greatly enhances sealing of the housing assembly, ensures tight attachment, and keeps optical parts in suitable alignment.

In a second example, the attaching member, e.g. a screw or fastener, is arranged with a longitudinal axis thereof arranged parallel to at least one of the first and second surfaces of the electronics carrier, or perpendicular to the optical axis of the lens assembly. The longitudinal axis of the screws in this second example is therefore at least substantially perpendicular to the longitudinal axis of the screws in the first example. In this second example, the attaching members may be arranged at any side of the electronics carrier. The seal is resilient in nature such that when pressed in use the assembly is efficiently attached.

Holes may be provided in both the housing parts as stated above for receiving corresponding screws. Said holes are preferably in the form of grooves or slots, e.g. oval or groove-shaped holes, for accommodating possible manufacturing tolerances. The screws may be inserted from any of the first and second surfaces of the electronics carrier.

Other examples where attaching members are arranged in different orientations are also envisaged.

With the attaching mechanism as the described above according to both the first and second examples, improved sealing, e.g. waterproof properties, is advantageously obtained for the housing assembly, ensuring good performance of the camera components therein. This was not possible in prior art assemblies since screws made sealing difficult as they do not provide good waterproof properties by themselves however well tightened. The use of sealing gaskets applied to screw heads in prior art assemblies for overcoming sealing problems undesirably added complexity and thus costs. With the present housing assembly, a single sealing in the electronics carrier and the first and second housing parts is sufficient for ensuring good sealing and thus good performance. A further advantage of the above described configuration is that EMC compliance can be maintained due to the electrical attachment between the first housing part and the second housing part. In addition, less time is required for assembling of the first and second housing parts.

BRIEF DESCRIPTION OF THE DRAWINGS

A non-limiting example of the present disclosure will be described in the following, with reference to the appended drawings, in which:

FIG. 3b is an enlarged detail view of FIG. 3a;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
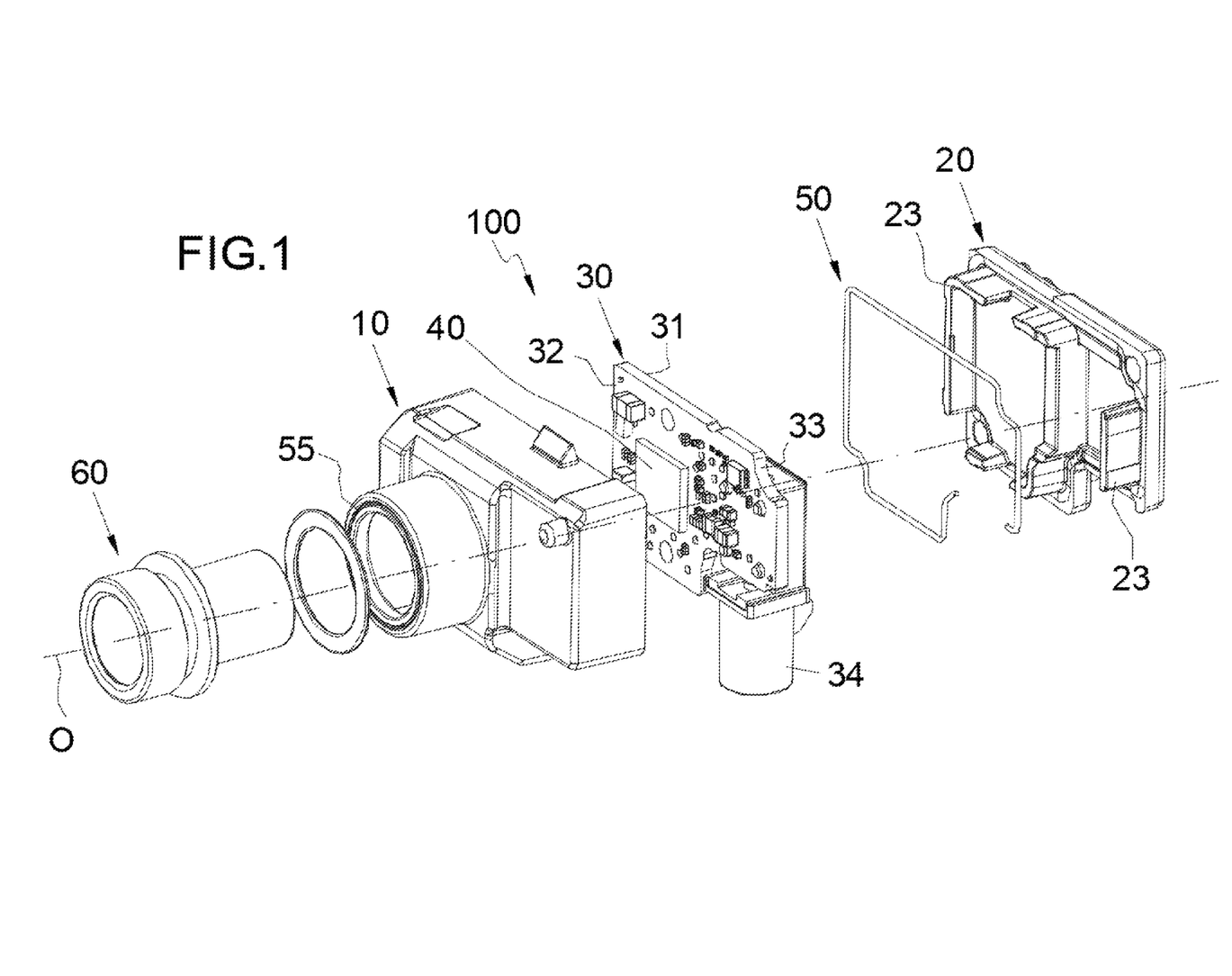
FIG. 1 is an exploded view of one example of the present motor vehicle camera assembly.
Figure 2:
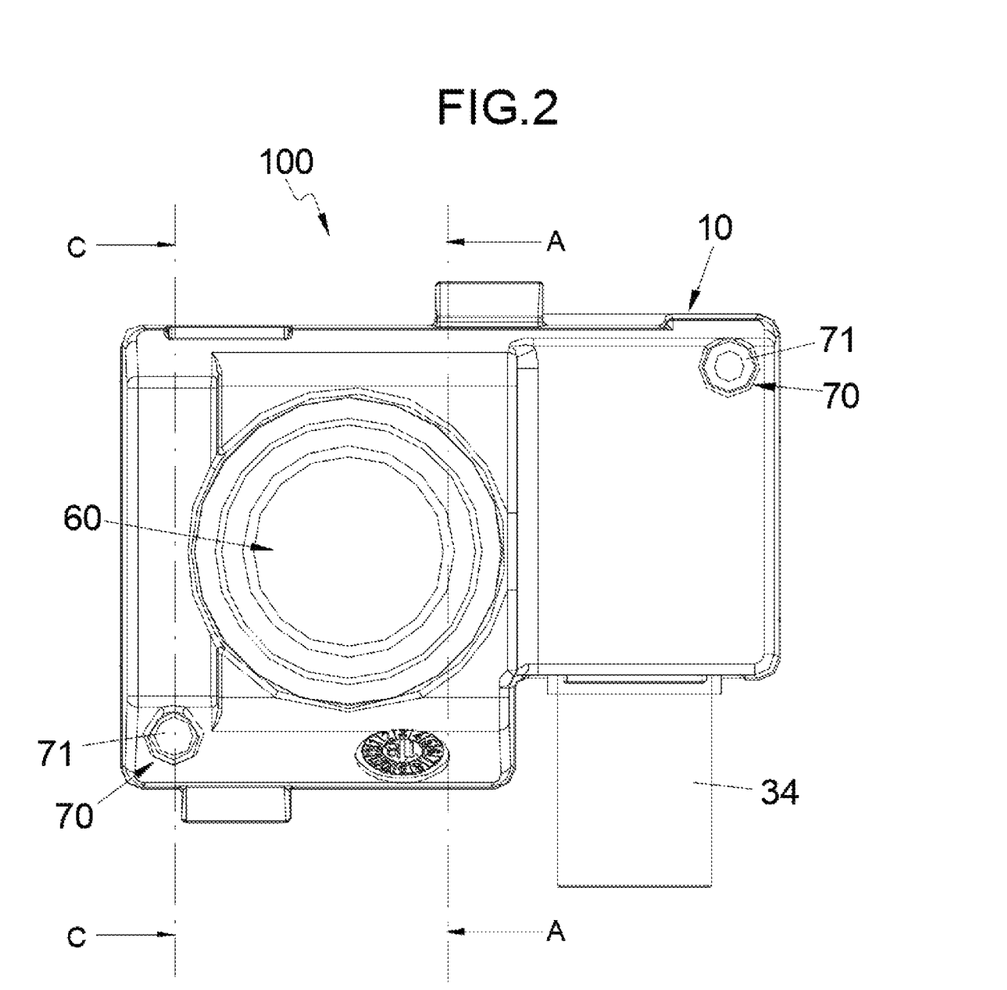
FIG. 2 is a front elevational top view of the camera assembly in FIG. 1.

A motor vehicle camera assembly 100 is disclosed herein, two examples of which are shown in FIGS. 1-7 of the drawings. The motor vehicle camera assembly 100 comprises a housing that defines an inner space therein suitable for receiving an electronics carrier 30 as shown in FIG. 1.

Continuing with FIG. 1, the housing comprises a first housing part or front housing 10 and a second housing part or back housing 20, both made, for example, of an electrically conductive material such as aluminum.

Figure 4:
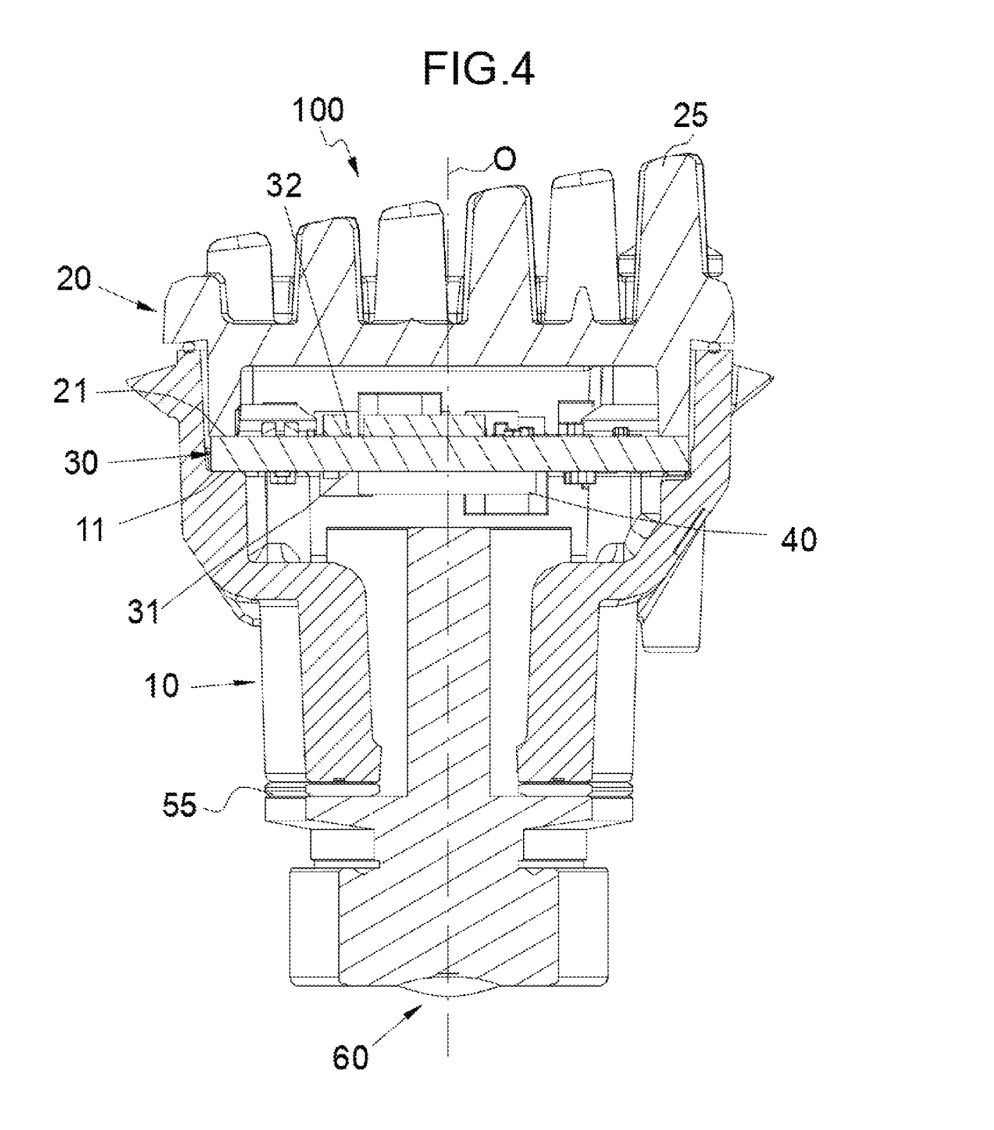
FIG. 4 is a sectional view of the first example of the camera assembly taken along line A-A in FIG. 2.
Figure 6:
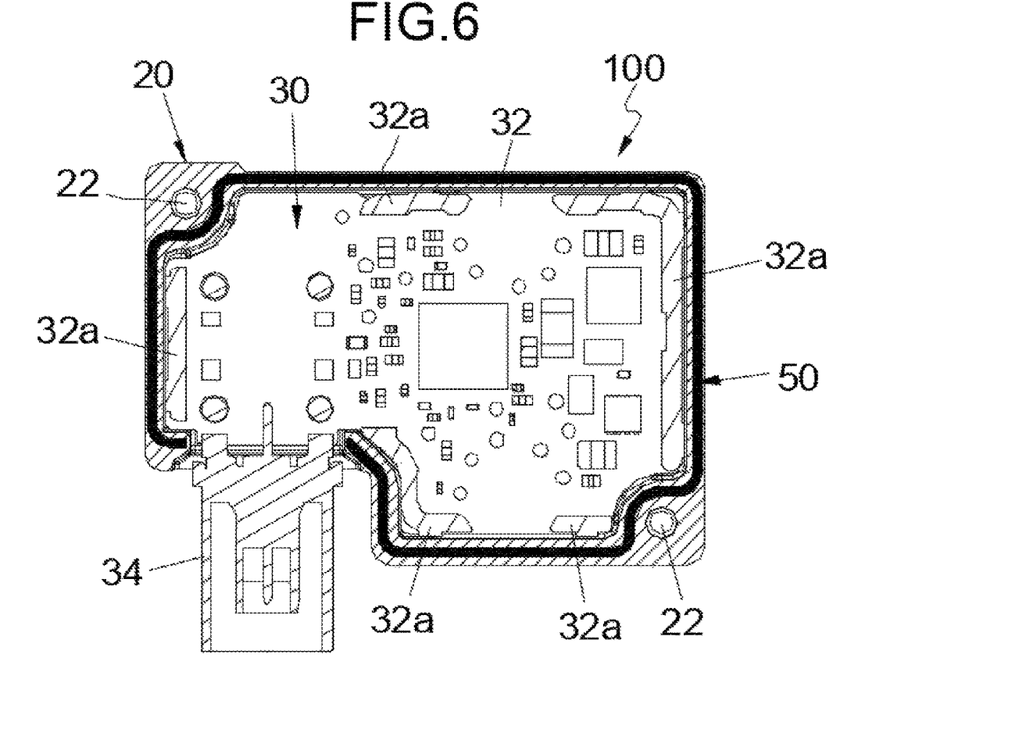
FIG. 6 is a sectional view of the camera assembly taken along line B-B in FIG. 5 showing one example of an electronics carrier.
Figure 7:
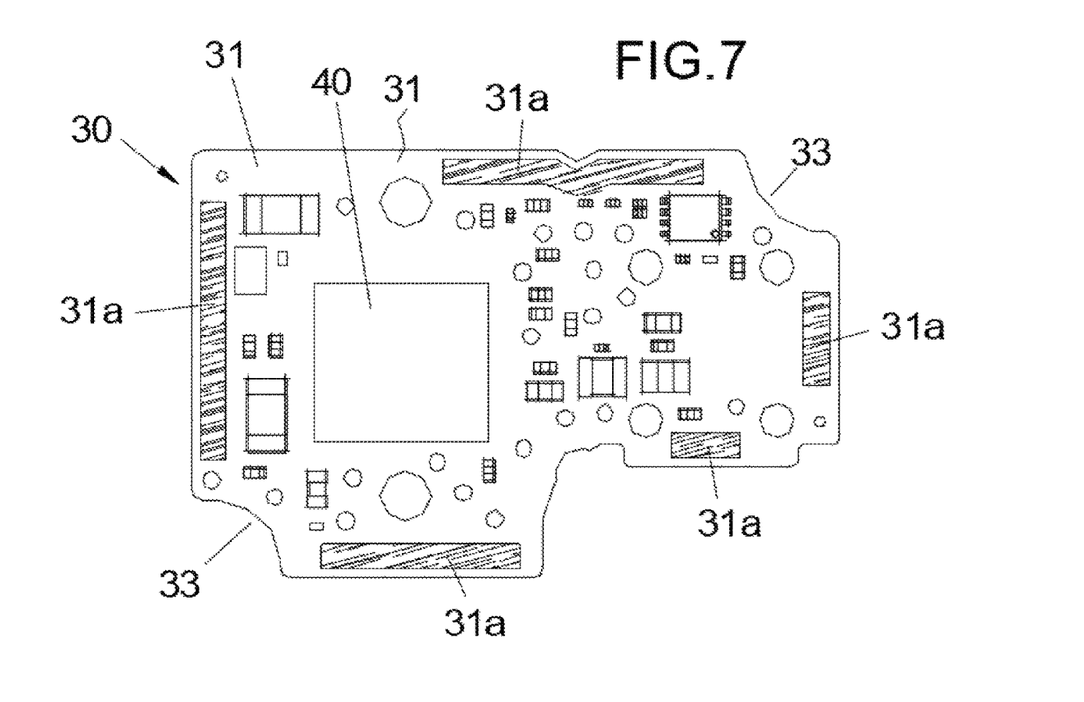
FIG. 7 is a top view of the electronics carrier in FIG. 6 shown in isolation.

The electronics carrier 30 shown in FIGS. 6 and 7 is a single, rigid, printed circuit board (PCB) 30 that carries an image sensor or imager 40 as shown in FIGS. 1, 4 of the drawings. The image sensor 40 may be, for example, an RGB sensor coupled to one surface 31, 32 of the PCB 30 intended to capture optical images from the exterior. There may be cases where two or more PCBs are provided. For example, a first PCB may be provided having a connector coupled to one side by the front housing 10, and a second PCB may be also provided, with the image sensor 40 being coupled to the other side by the back housing 20. Other configurations for the electronics carrier 30 are of course possible within the scope of the present disclosure. In the example shown in FIGS. 6 and 7, the PCB 30 has electronics components such as the above-mentioned image sensor 40, and a connector (not shown) configured to receive the at least one pin of the adapter 34. As shown in FIG. 6, the PCB 30 comprises a layer of conductive material arranged on the first surface 31 and second surface 32 of the PBC 30 at or near the perimeter thereof where a contact or sandwich area of the PBC 30 with the first and second housing parts 10, 20 is located. The layer of conductive material is preferably 0.2 to 10 mm wide, preferably 0.8 mm, both in the first surface 31 and the second surface 32 of the PCB 30.

In use, the first housing part 10 and the second housing part 20 are attached to each other so as to define the above-mentioned inner space, such that, in use, they are aligned with each other along an optical axis O.

Figure 3:
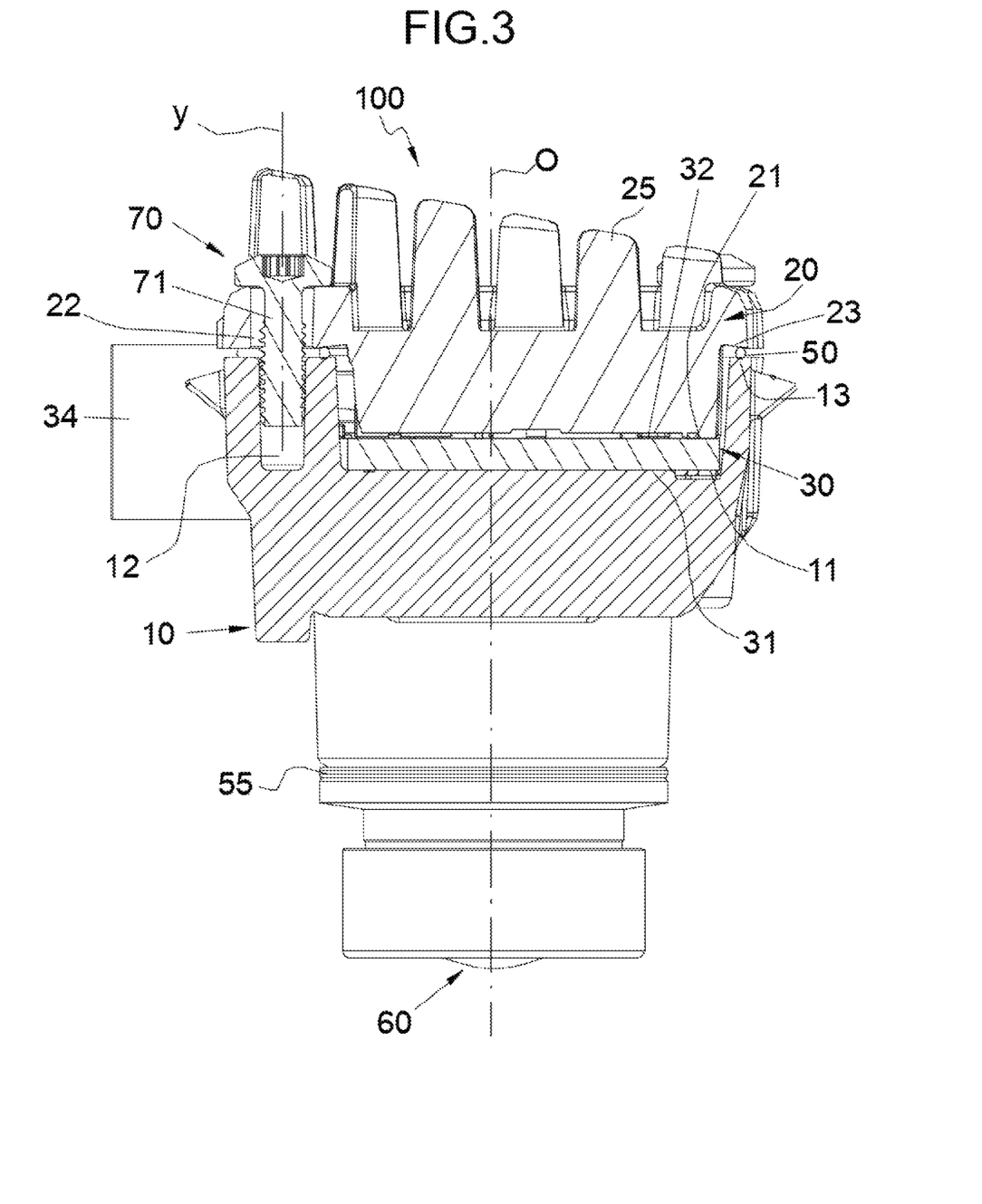
FIG. 3 is a sectional view of a first example of the camera assembly taken along line C-C in FIG. 2.

The first housing part 10 and the second housing part 20 are configured such that, in use, are attached facing each other such that a contact interface is defined there between. More specifically, in use, the first and second housing parts 10, 20 are attached to each other with an interference fit and they are electrically connected to the PCB 30, which in turn is tightly clamped there between. On the other hand, the second housing part 20 in the example shown has a number of heat dissipators 25 as shown in FIGS. 3-5. The above configuration results in that heat dissipation is greatly enhanced.

Reliable attachment of the first housing part 10 and the second housing part 20 is accomplished by the attaching mechanism 70 described above. In the example shown, the attaching mechanism 70 comprise a number of screws 71 wherein, in use, that is, with the first and second housing parts 10, 20 attached to each other, at least one contact area 21 of second housing part 20 contacts at least one contact area 32a in a second surface 32 of the PCB 30 (shown in FIG. 6), and at least one contact area 11 of the first housing part 10 contacts at least one contact area (not shown) in the first surface 31 of the PCB 30. A contact interface is thus defined by the respective contact areas 11, 21, as shown in FIGS. 3, 3a, 4, and 4a, of the first and second housing parts 10, 20 to contact the corresponding contact areas 32a in the first and second surfaces 31, 32 of the PCB 30, respectively.

In use, that is with the first and second housing parts 10, 20 attached to each other, the contact area 11 of the first housing part or front housing 10 presses against the first surface 31 of the PCB 30, while the contact area 21 of the second housing part or back housing 20 presses against the second surface 32 of the PCB 30. More specifically, both contact areas 11, 21 contact electrically conductive portions 31a, 32a of the PCB 30 that are formed in a perimeter edge in said first and second surfaces 31, 32 of the PCB 30 as shown in FIG. 7 of the drawings. The electrically conductive portions 31a, 32a of the PCB 30 which in use are pressed by the contact areas 11, 21 of the first and second housing parts 10, 20 are made of or contain an electrically conductive material for enabling electrical connection of the PCB 30 and the front and back housings 10, 20. This advantageously contributes both to creating a Faraday cage and dissipating heat.

In use, the first housing part 10 is coupled to the second housing part 20 with the PCB 30 tightly sandwiched there between, as shown in FIGS. 3 and 4. A conductive material is provided in the above mentioned contact areas 32a of the PCB 30 for contacting the corresponding contact areas 11, 21 of the first and second housing parts 10, 20. The conducive material in contact areas of the PCB 30 may be for example copper, tin, silver, gold, etc. or a combinations thereof and be of the order of 0.8 mm wide.

Figure 3A:
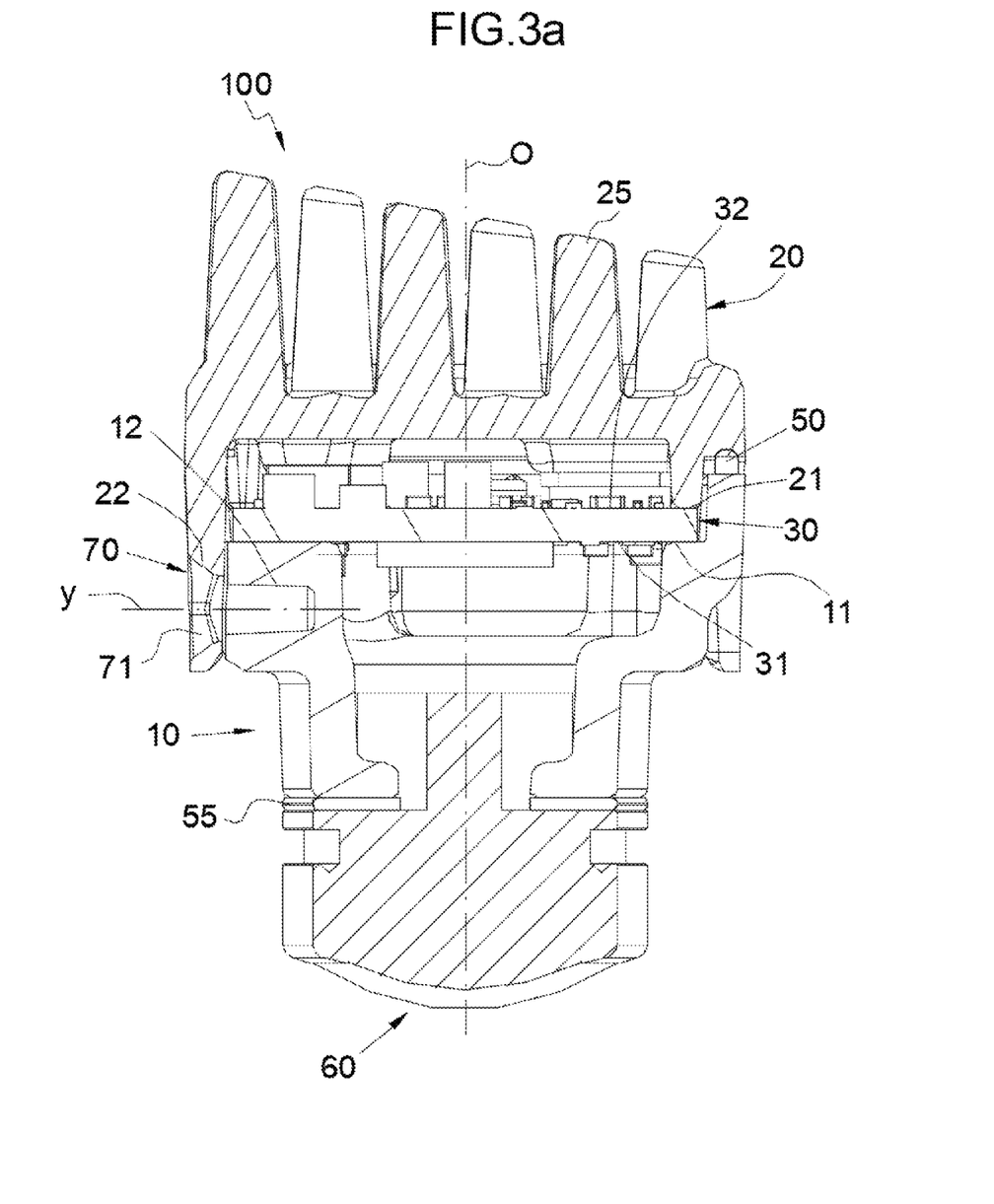
FIG. 3a is a sectional view of a second example of the camera assembly taken along line C-C in FIG. 2.
Figure 3B:
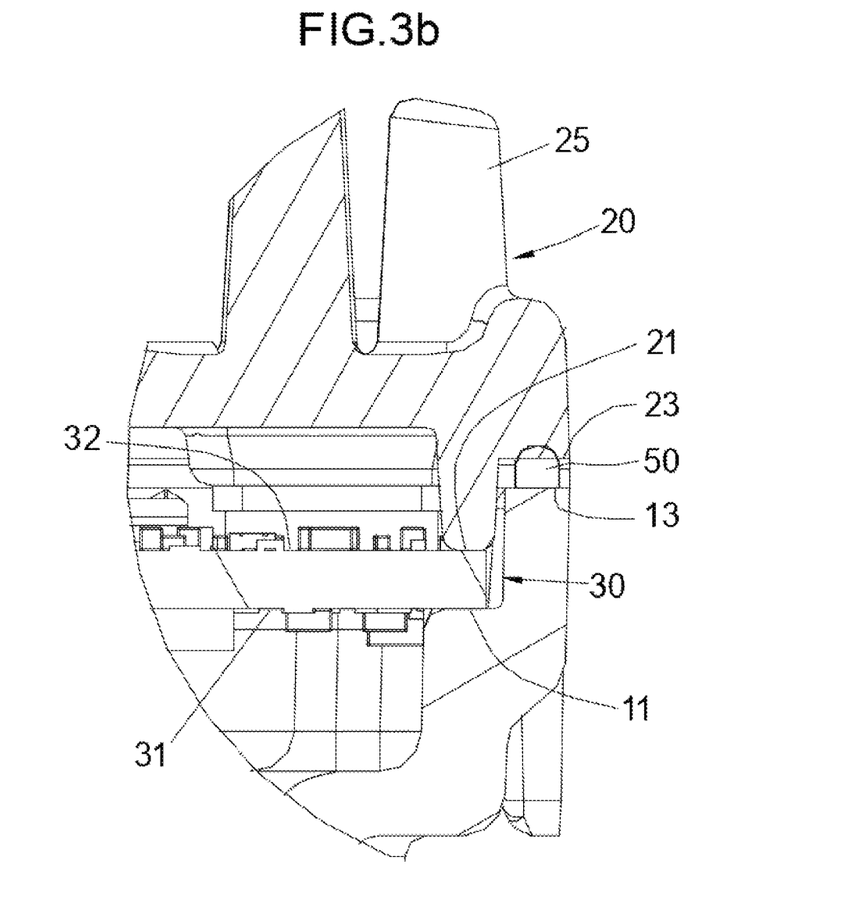

Referring to FIG. 3b, contact portions 13, 23 are defined in the first and second housing parts 10, 20 respectively by corresponding protrusions extending parallel to the optical axis O, that is, perpendicular to the first and second surfaces 31, 32 of the PCB 30. Portions in the first and second surfaces 31, 32 of the PCB 30 to be contacted by contact areas 11, 21 of the first and second housing parts 10, 20 are about 0.2-10 mm wide, preferably 0.8 mm wide. The portions of the PCB 30 to be contacted by the contact areas 11, 21 of the first and second housing parts 10, 20 may be continuous or not, that is, the portions may perimetrically surround the PCB 30 continuously or not. As it can be seen from the drawings, the contact areas 11, 21 of the first and second housing parts 10, 20 are closer to the optical axis O than the contact portions or protrusions 13, 23 of the first and second housing parts 10, 20. As a result, heat dissipation is enhanced.

As shown in FIGS. 2, 3, 3a, and 5 of the drawings, the attaching mechanism 70 comprise screws 71 as state above, intended to be screwed into respective holes 12, 22 in the first and second housing parts 10, 20. This reliably ensures efficient attachment of the first and second housing parts 10, 20 while keeping them and the optical components therein properly aligned with each other along the optical axis O. In use, the screws 71 are partially inserted into the first housing part 10 and substantially fully inserted into the second housing part 20 for attaching both housing parts 10, 20 to each other under an axial force that may be of the order 200 N. It is however noted that axial force values range depending on the nature and size of the seal 50. For example, higher axial force is required when the seal 50 is made of rubber than when the seal 50 is made of glue. Also, the wider the seal 50, the higher the axial force to be applied.

In the first example shown in FIGS. 1, 2, 3, 4 and 5 of the drawings, the screws 71 are arranged with their longitudinal axis y arranged perpendicular to the first and second surfaces 31, 32 of the PCB 30, or parallel to the optical axis O of the lens assembly 60, with the seal 50 arranged between the holes 12, 22 for the screws 71 and the PCB 30 as shown in FIG. 6. In this way, the screws 71 do not pass through the PCB 30 as a result of which a water-tight housing assembly is advantageously obtained. As the screws 71 are tightened the force between the front housing 10 and the back housing 20 is increased resulting in the PCB 30 being suitably sandwiched there between under pressure. With the screws 71 arranged as described, alignment of the first and second housing parts 10, 20 is advantageously ensured, resulting in a good camera performance.

Figure 4A:
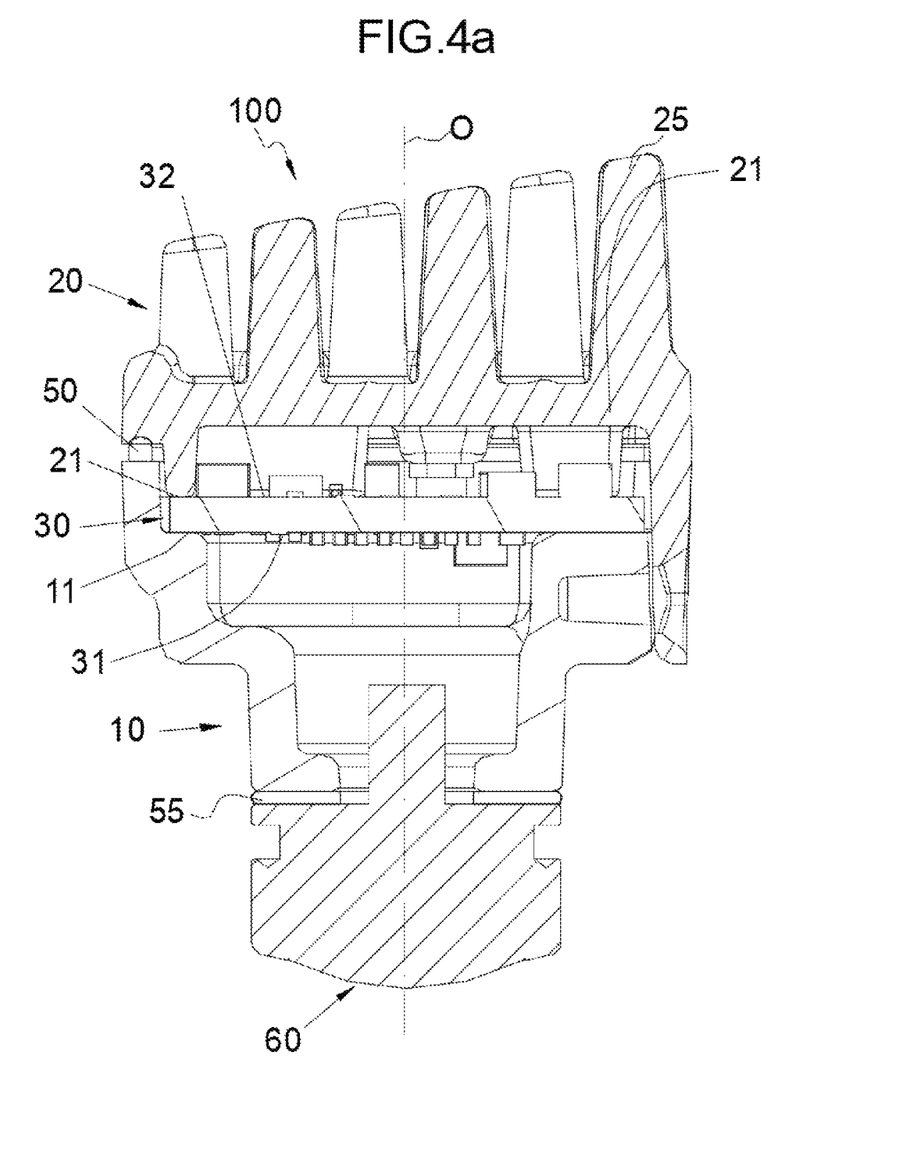
FIG. 4a is a sectional view of the second example of the camera assembly taken along line A-A in FIG. 2.
Figure 5:
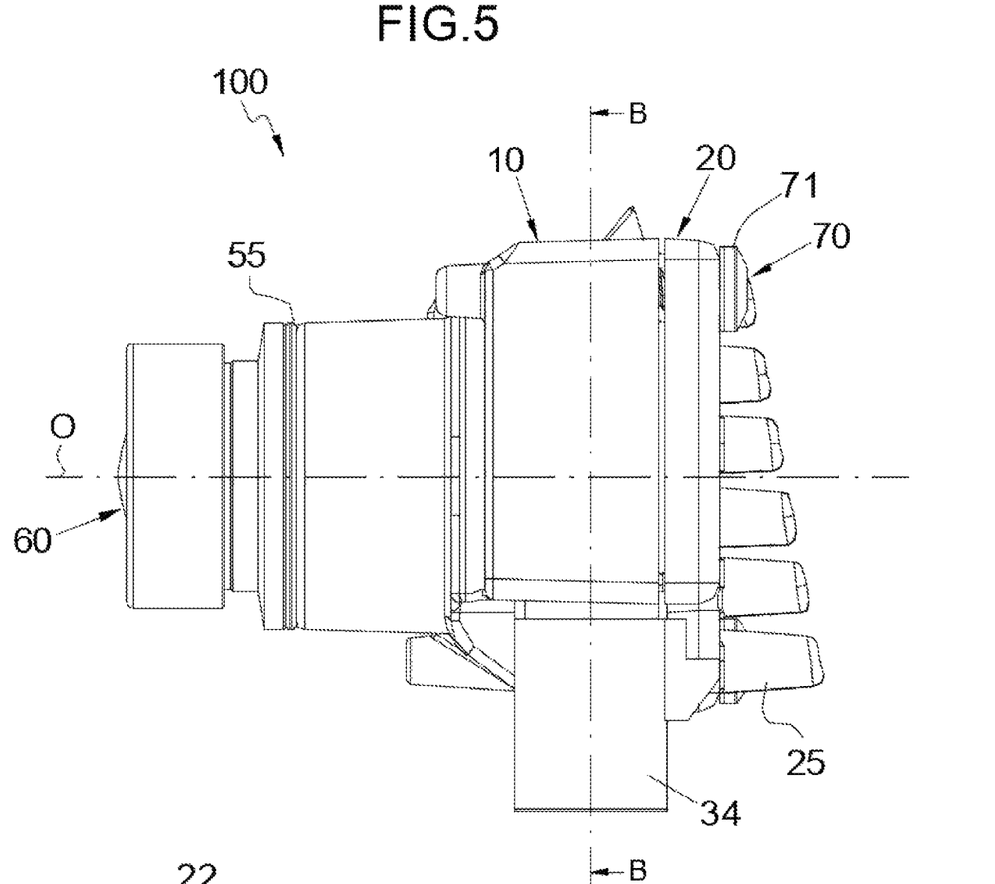
FIG. 5 is a side elevational view of the camera assembly in FIG. 1.

In a second, preferred example shown in FIGS. 3a, 4a, the screws 71 are arranged with their longitudinal axis y parallel to the first and second surfaces 31, 32 of the PCB 30, or perpendicular to the optical axis O of the lens assembly 60.

Other arrangements for the screws 71 relative to the optical axis O of the lens assembly 60 are also possible.

Figure 8:
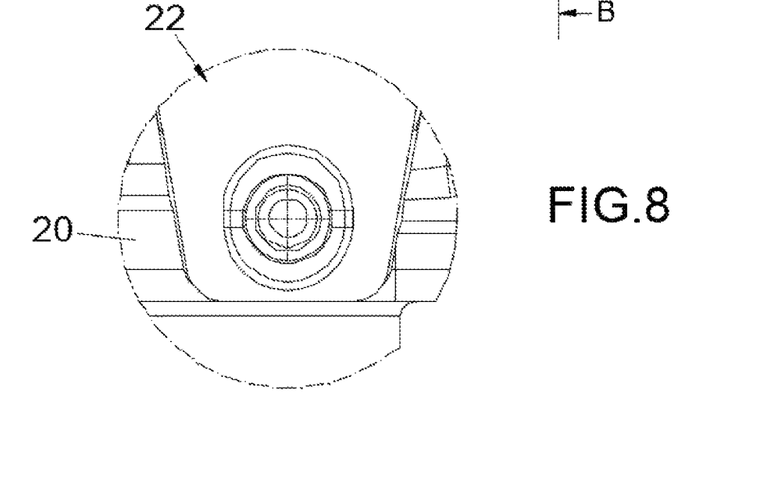
FIG. 8 is a fragmentary plan view showing in detail an oval shaped hole formed in the first housing part or the second housing part for accommodating manufacturing tolerances.

As stated above, the first and second housing parts 10, 20 are provided with a threaded hole 12 and a blind hole 22 for receiving the screws 71. In both examples, at least one of the blind holes 22 in the second housing part 20 is oval or groove-shaped holes or slots for accommodating possible manufacturing tolerances. One example of such groove-shaped blind hole 22 formed in an outermost lateral wall of the second housing part 20 is shown in FIG. 8. It is an oval blind hole 22 whose elongated shape extends along a direction of attachment of the first and second housing parts 10, 20. The oval shaped blind holes 22 in the second housing part 20 may be in other examples not threaded, whereas the hole 12 in the first housing part 10 may be circular and preferably threaded. Further different combinations for the holes 12, 22 in the first and second housing parts 10, 20 are also envisaged.

For assembling the camera assembly 100, in particular in the second example where the screws 71 are arranged perpendicular to the optical axis O, the back housing 20 is placed adjacent the front housing 10 or vice versa, and an external pressure is applied on one another. Pressure may be for example applied along the optical axis O. Once the holes 12, 22 in the front and back housings 10, 20 are aligned with each other, the screws 71 are screwed therein and external pressure is released.

FIG. 3a shows the screws 71 are arranged between the PCB 30 and the lens assembly 60. However, other locations are of course not ruled out such as between the heat dissipaters 25 and the PCB 30. That is, the screws 71 may be arranged at any side of the PCB 30 as long as the longitudinal axis of the screws 71 are substantially perpendicular to the direction of attachment of both housings 10, 20.

As shown in FIG. 3a, the outermost lateral wall of the back housing 20 extends in the direction of attachment of the front and back housing 10, 20, such that at least a portion of the said outermost lateral wall of the back housing 20 is in adjacent position of at least a portion of the outermost lateral wall of the front housing 10, that is, the lateral walls of the back housing 20 are arranged next to those of the front housing 10. Thus, in use, a portion of the outermost lateral wall of the back housing 20 may at least partially surround the outermost lateral wall of the front housing 10 although in other examples a portion of the lateral walls of the back housing 20 may be arranged inside of the lateral walls of the front housing 10. In other words, a portion of the outermost lateral wall of the front housing 10 may at least partially surround the outermost lateral wall of the back housing 20 (not shown).

Holes may be provided in the outermost lateral walls of both housing parts 10, 20 for receiving the corresponding screws 71.

The seal 50 is of a resilient nature such that when pressed in use the assembly is efficiently attached. The seal 50 may be a rubber gasket or a glue that is pressed in the direction of attachment of the front and back housing 10, 20. As shown in FIG. 3a, the screws 71 are substantially perpendicular to the main direction of deformation of the seal 50.

According to the preferred second example, the above-mentioned pressure applied along the direction of attachment of the front and back housing 10, 20 deforms the seal 50 which is advantageous as this causes alignment of the oval hole of the outermost lateral wall of the back housing 20 and the threaded hole of the outermost lateral wall of the front housing 10. As explained above, the screws 71 may be inserted through the aligned holes and then the applied force may be removed. As shown in FIGS. 6 and 7, the PCB 30 has one or more open notches 33 located at the corresponding corners of the PCB 30. The open notches 33 are suitable for centering the PCB 30 within the first and second housing parts 10, 20. As stated above, the screws 71 do not pass through the PCB 30. As a result, in use, the screws 71 tighten the front and back housings 10, 20 to each other by passing through open areas of the PCB 30, defined by the notches 33 with no parts piercing, crossing, or otherwise passing through the material of the PCB 30.

The vehicle camera assembly 100 further includes a camera having a lens assembly 60. The lens assembly 60 has longitudinal axis that defines the above-mentioned optical axis O. As shown in FIGS. 3-5, the lens assembly 60 is partially inserted into the front housing 10 and attached thereto by glue or bonded through a cured adhesive 55. If the lens assembly 60 is bonded to the front housing 10 through a cured adhesive 55, such adhesive is initially cured through a first curing process with an initial curing step comprising exposure to UV light, and is then further cured into a further cured strength through a second curing process. However, other mechanisms for attaching the lens assembly 60 to the front housing 10 may be used such as by screwing. The lens assembly 60 is in communication to the above-mentioned image sensor 40 that is coupled to the PCB 30. The attaching mechanism 70 therefore ensure that the lens assembly 60 and the image sensor 40 are properly aligned with each other along the optical axis O.

The seal 50, such as a thermal pad or gap filler, are positioned between the holes 12, 22 for the attaching members 71 and the PCB 30 as shown in FIG. 6 of the drawings. The seal 50 is preferably made of an electrically and heat conductive material of an elastic and deformable nature. In use, the seal 50 is arranged on the contact portions 13, 23 formed in the first and second housing parts 10, 20. Contact portions 13, 23 may comprise protrusions, guides, and other suitable contact mechanism. In this condition, with the first and second housing parts 10, 20 attached to each other with the PCB 30 in between, the seal 50 reliably prevent external elements such as water, moisture, dirt, etc. from entering the camera assembly 100. Since the seal 50 is elastic in nature as described above and, in use, are pressed by a force that is substantially perpendicular to the first and second surfaces 31, 32 of the PCB 30, the first and second housing parts 10, 20 are appropriately attached to each other.

As stated above, two opposed surfaces 31, 32 are defined in the PCB 30 where contact areas 32a exist intended to contact respective contact areas 11, 21 of the first and second housing parts 10, 20. Such contact areas 32a in the opposed surfaces 31, 32 of the PCB 30 are made of a conductive material are formed adjacent the edges of the PCB 30 as shown in FIG. 6. Sealing, heat dissipation is greatly improved while EMC compliance is advantageously improved by the electrical attachment between the first and second housing parts 10, 20.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim and shall not be construed as limiting the scope of the claim.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A motor vehicle camera assembly comprising:
   a first housing part,
   a second housing part, wherein the first housing part and the second housing part are made of an electrically conductive material,
   a single electronics carrier that includes a first planar surface and a second planar surface on opposite planar sides, wherein the first planar surface comprises a first electrically conductive portion and the second planar surface comprises a second electrically conductive portion, and
   an attachment member that attaches the first housing part and the second housing part together to define an inner space for receiving therein at least the single electronics carrier, wherein the attachment member is configured such that, when the first housing part and the second housing part are attached to each other, the first housing part contacts at least the first electrically conductive portion of the first planar surface of the single electronics carrier and the second housing part contacts at least the second electrically conductive portion of the second planar surface of the single electronics carrier, wherein the first housing part and the second housing part each include at least a portion that directly contacts and presses against the single electronics carrier to tightly sandwich the single electronics carrier therebetween fixing the single electronics carrier solely by the first housing part and the second housing part pressing against the single electronics carrier to be electrically connected to the single electronics carrier;
   wherein both the first electrically conductive portion and the second electrically conductive portion are formed adjacent to an outermost edge of the single electronics carrier;
   wherein the attachment member is spaced from the single electronics carrier and is disposed at least partially through the first housing part and the second housing part; and
   wherein the first housing part includes an outwardly extending portion that extends past the first planar surface and the second planar surface of the single electronics carrier to overlap at least a portion of the second housing part.

2. The motor vehicle camera assembly of claim 1, wherein the first housing part and the second housing part are configured to be attached to each other with an interference fit with the first housing part and the second housing part being electrically connected to the single electronics carrier.

3. The motor vehicle camera assembly of claim 1, wherein a longitudinal axis (y) of the attachment member is arranged perpendicular to at least one of the first planar surface and the second planar surface of the single electronics carrier.

4. The motor vehicle camera assembly of claim 1, wherein a longitudinal axis (y) of the attachment member is arranged parallel to at least one of the first planar surface and the second planar surface of the single electronics carrier.

5. The motor vehicle camera assembly of claim 1, wherein the attachment member is adapted to be at least partially inserted into the first housing part and at least substantially fully inserted into the second housing part.

6. The motor vehicle camera assembly of claim 1, wherein the attachment member is a screw or a fastener.

7. The motor vehicle camera assembly of claim 1, wherein a longitudinal axis (y) of the attaching member is arranged perpendicular to at least one of the first planar surface and the second planar surface of the single electronics carrier.

8. The motor vehicle camera assembly of claim 1, wherein the second housing part includes a recess to receive the outwardly extending portion of the first housing part.

9. The motor vehicle camera assembly of claim 1, wherein the second housing part is integrally formed and completely covers the second planar surface of the single electronics carrier.

10. The assembly of claim 1 further comprising a seal that includes an electrically conductive material arranged between respective first contact portion in the first housing part and second contact portion of the second housing part.

11. The motor vehicle camera assembly of claim 10, wherein the seal is of an elastic and deformable nature.

12. A motor vehicle camera assembly comprising:
   a first housing part,
   a second housing part, wherein the first housing part and the second housing part are made of an electrically conductive material,
   a single electronics carrier that includes a first planar surface and a second planar surface on opposite sides of the single electronics carrier, wherein the first planar surface comprises a first electrically conductive portion and the second planar surface comprises a second electrically conductive portion, and
   an attachment member for attaching the first housing part and the second housing part together to receive the single electronics carrier, wherein the attachment member is configured such that, when the first housing part and the second housing part are attached to each other, the first housing part contacts the first electrically conductive portion on the first planar surface of the single electronics carrier and the second housing part contacts at least the second electrically conductive portion on the second planar surface of the single electronics carrier,
   wherein the first housing part and the second housing part each include a portion that directly contacts and clamps the first planar surface and the second planar surface of the single electronics carrier, respectively, to tightly sandwich the single electronics carrier therebetween;
   wherein both the first electrically conductive portion and the second electrically conductive portion are provided adjacent to an outermost edge of the single electronics carrier;
   wherein the attachment member is spaced from the single electronics carrier and is disposed at least partially through the first housing part and the second housing part; and
   wherein the first housing part includes an outwardly extending portion that extends past the first planar surface and the second planar surface of the single electronics carrier to overlap at least a portion of the second housing part.

13. The motor vehicle camera assembly of claim 12, wherein the second housing part includes a recess to receive the outwardly extending portion of the first housing part.

14. The motor vehicle camera assembly of claim 12, wherein the second housing part is integrally formed and completely covers the second planar surface of the single electronics carrier.

15. A motor vehicle camera assembly comprising:
   a first housing part,
   a second housing part,
   an attachment member that attaches the first housing part to the second housing part together to define an inner space, at least one electronics carrier received within the inner space defined by the first housing part and the second housing part, the at least one electronics carrier including a first planar surface and a second planar surface that is positioned to face an opposite direction relative to the first planar surface;

a lens assembly in communication with an image sensor coupled to the at least one electronics carrier to capture an optical image, wherein the lens assembly and the image sensor are aligned with each other along an optical axis, wherein the attachment member is configured such that, when the first housing part and the second housing part are attached to each other, the first housing part contacts at least a portion of the first planar surface of the at least one electronics carrier and the second housing part contacts at least a portion of the second planar surface of the at least one electronics carrier, wherein the first housing part is adapted to be coupled to the second housing part with the at least one electronics carrier being tightly sandwiched there between with at least a first contact portion of the first housing part and at least a second contact portion of the second housing part directly contacting and applying clamping pressure to a first portion of the at least one electronics carrier and a second portion of the at least one electronics carrier, wherein the first portion of the at least one electronics carrier and the second portion of the at least one electronics carrier are positioned adjacent to an outermost edge of the at least one electronics carrier;

wherein the motor vehicle camera assembly further comprises a seal arranged on the at least one first contact portions formed in the first housing part and at least one second contact portion of the second housing part and located in a plane normal to the optical axis between a longitudinal axis of the attachment member and the optical axis; and wherein the first housing part includes an outwardly extending portion that extends past the first planar surface and the second planar surface of the at least one electronics carrier to overlap at least a portion of the second housing part.

16. The motor vehicle camera assembly of claim 15, wherein the second housing part includes a recess to receive the outwardly extending portion of the first housing part.

17. The motor vehicle camera assembly of claim 15, wherein the second housing part is integrally formed and completely covers the second planar surface of the at least one electronics carrier.

* * * * *